(12) United States Patent
Lee et al.

(10) Patent No.: US 7,719,930 B2
(45) Date of Patent: May 18, 2010

(54) APPARATUS AND METHOD FOR DIGITAL CONTENTS PLAYBACK

(75) Inventors: Duk Hyun Lee, Cheonan-si (KR); Hee Jong Bae, Seoul (KR)

(73) Assignee: Reigncom Ltd., Seoul (KR)

( * ) Notice: Subject to any disclaimer, the term of this patent is extended or adjusted under 35 U.S.C. 154(b) by 1419 days.

(21) Appl. No.: 10/828,123

(22) Filed: Apr. 19, 2004

(65) Prior Publication Data

US 2005/0078568 A1      Apr. 14, 2005

(30) Foreign Application Priority Data

Oct. 8, 2003    (KR) ............... 10-2003-0069907
Apr. 1, 2004    (KR) ............... 10-2004-0022554

(51) Int. Cl.
*G11B 21/08* (2006.01)

(52) U.S. Cl. ............... 369/30.08; 707/104.1

(58) Field of Classification Search ............ 369/30.03, 369/30.07, 30.08, 30.09; 707/100, 104.1
See application file for complete search history.

(56) References Cited

U.S. PATENT DOCUMENTS

| | | | |
|---|---|---|---|
| 6,574,176 B1 * | 6/2003 | Schylander | 369/47.15 |
| 6,847,593 B2 * | 1/2005 | Millikan et al. | 369/30.23 |
| 7,043,477 B2 * | 5/2006 | Mercer et al. | 707/7 |
| 2002/0085722 A1 * | 7/2002 | Asano et al. | 380/278 |
| 2002/0181338 A1 * | 12/2002 | Fujita et al. | 369/30.09 |
| 2003/0002399 A1 * | 1/2003 | Millikan et al. | 369/30.23 |
| 2003/0058781 A1 * | 3/2003 | Millikan et al. | 369/272 |
| 2005/0234999 A1 * | 10/2005 | Millikan et al. | 707/104.1 |

* cited by examiner

*Primary Examiner*—Tan X Dinh
(74) *Attorney, Agent, or Firm*—Lee, Hong, Degerman, Kang & Waimey (57) ABSTRACT

A digital contents playback and a method for playing the same are provided. The digital contents playback comprises an arrangement unit for re-arranging digital contents stored in a recording medium by selecting a "breath first arrangement mode", a "depth first arrangements mode" and a "disk all arrangement mode". The "disk all arrangement mode" consists of a "filename first arrangement mode" and a "physical address first arrangement mode". The "physical address first arrangement mode" arranges digital contents stored in the recording medium in physical address sequence. The arrangement unit arranges the digital contents to be suitable for a determined mode by user's selection, and the digital contents are played in the arranged sequence. When digital contents are arranged depending on the "physical address first arrangement mode" in a playback using a compact disk as a recording medium, driving distance of an optic pick-up module for playing digital contents on the compact disk is shortened, which results in reduction of power consumption and noise.

27 Claims, 8 Drawing Sheets

APPARATUS AND METHOD FOR DIGITAL CONTENTS PLAYBACK

CROSS-REFERENCE TO RELATED APPLICATIONS

Pursuant to 35 U.S.C. §119(a), this application claims the benefit of earlier filing date and right of priority to Korean Application No. 2003-69907, filed on Oct. 8, 2003 and Korean Application No. 2004-22554, filed on Apr. 1, 2004, the contents of which are hereby incorporated by reference herein in their entirety.

BACKGROUND OF THE INVENTION

1. Field of the Invention

The present invention generally relates to a digital contents playback apparatus and a method for playing back the same, and more specifically, to an apparatus and method for digital contents playback wherein a user can select play sequence of digital contents such as a MP3 file stored in a readable/writeable medium and reduce noise and power consumption by selecting play sequence with reference to a physical address if necessary, and a method for replaying the same.

2. Description of the Related Art

Recently, digital contents have been produced and distributed as various types including audio, video or text, and various playback devices have been developed so that a user may enjoy the above digital contents off-line or on-line.

The digital contents can be freely read/written by a packet-writing method, and also deleted, moved and added on a recording medium. Furthermore, the digital contents can be classified and stored as hierarchical-structured files depending on selection of users.

As read/write compact disks become cheaper, portable digital contents (hereinafter, referred to as "file") playbacks with read/write compact disks have been widely used.

Files are recorded to tracks on a read/write compact disk, and sequentially recorded to an empty region located from the center of the disk to outside. If files are repeatedly deleted, moved and added, data corresponding to one file can be stored in various regions having different physical address. Although files are included in the same folder, the actual physical address of each file is remote from each other.

A digital contents playback with read/write compact disks arranges files in arrangement sequence of a "breadth first arrangement mode" or a "depth first arrangement mode", and play sequence depends on the arrangement sequence. As a result, the play sequence is fixed as one of the above-described modes.

The "breadth first arrangement mode" is to first arrange an upper layer folder, and the "depth first arrangement mode" is to first arrange the lowest layer folder and then sequentially arrange the upper layer folder.

For example, when folders A and B are included in the upper layer folders and folders C and D are included in the lower layer folder, the folders are arranged in A, B, C, D order according to the "breadth first arrangement mode" or in A, C, D, B order according to the "depth first arrangement mode". In both cases, the folders are arranged regardless of physical address of files included in the folders.

Therefore, when a music file with a MP3 format is stored in a read/write compact disk as digital contents and the digital contents are played in a digital contents playback, the digital contents playback frequently drives an optic pick-up module in a process for finding a physical address of a file corresponding to the next music. In the digital contents playback using the above-described compact disk, the optic pick-up module is driven by a DC motor to result in noise. Even when files are scattered physically, noise becomes more intense because the optic pick-up module is frequently driven.

Moreover, since play sequence has been determined depending on a mode regardless of physical address in a conventional digital contents playback using a compact disk, a path where an optic pick-up module moves becomes longer, which results in large power consumption.

Particularly, a portable digital contents playback is configured to use recording media such as a semiconductor memory (flash memory, etc.) or a hard disk as well as the above read/write compact disk in digital contents storage.

However, the conventional digital contents playback plays files, which are classified as a hierarchical structure and stored in a recording medium, in sequence depending on a previously fixed arrangement mode. As a result, the conventional digital contents playback does not cope with demand of users who wants to listen to contents files in various sequence.

SUMMARY OF THE INVENTION

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is an object of the present invention to provide a digital contents playback apparatus and a method for playing the same which may retrench power consumption in digital contents play and reduce noise by determining play sequence of digital contents recorded in a recording medium such as a read/write compact disk on a basis of physical address to shorten movement distance of an optic pick-up module for digital contents play.

It is another object of the present invention to provide a method for playing digital contents whose play sequence is changeable depending on user's selection of arrange modes including a physical address first arrangement mode.

In an embodiment, there is provided a digital contents playback apparatus comprising: a key input unit for outputting key signals corresponding to a plurality of play modes, respectively, depending on user's manipulation; a play sequence arrangement unit for determining play sequence of digital contents stored in a recording medium depending on a corresponding play mode when key signals corresponding to play mode change are inputted in the key input unit; a data read means for reading the digital contents stored in the recording medium and outputting the digital contents as electrical signals depending on the play sequence determined in the play sequence arrangement unit; and a play signal processing unit for controlling driving of the data read means depending on the play sequence, and for restoring signals outputted from the data read means and outputting the signals as digital signals; and a signal converting unit for outputting signals outputted from the data read means to a predetermined connectable output device.

Preferably, the play sequence arrangement unit provides arrangement modes including at least two or more of a "breadth first arrangement mode", a "depth first arrangement mode" and a "disk all arrangement mode", and arrangement modes including at least one or more of a "filename first arrangement mode" and a "physical address first arrangement mode" corresponding to the "disk all arrangement mode".

Preferably, the play sequence arrangement unit performs one of the "breadth first arrangement mode" or the "depth first arrangement mode" preferentially for initialization at a turn-on point.

In another embodiment, there is provided a digital contents playback apparatus for playing digital contents stored in a compact disk. The digital contents playback apparatus comprises: a key input unit for outputting key signals corresponding to a "physical address first arrangement mode" depending on user's manipulation; a play sequence arrangement unit for setting a play mode to the "physical address first arrangement mode" corresponding to the key signal, and for determining play sequence of digital contents stored in the compact disk on a basis of physical address; an optic pick-up module for reading the digital contents stored in the recording medium depending on the play sequence determined in the play sequence arrangement unit and outputting the digital contents as electrical signals; a play signal processing unit for controlling driving of the optic pick-up module depending on the play sequence, and for restoring signals outputting from the optic pick-up module and outputting the signals as digital signals; and a signal converting unit for converting signals outputted from the play signal processing unit to analog signals, and outputting the analog signals to a connectable output device.

Preferably, the key input unit further comprises a function of outputting key signals corresponding to at least one or more of a "breadth first arrangement mode", a "depth first arrangement mode" and a "disk all arrangement mode", and the play sequence arrangement unit further comprises a function of determining play sequence corresponding to a selected play mode.

In still another embodiment, there is provided a digital contents playback apparatus comprising: a key signal generating unit for outputting key signals corresponding to a plurality of play modes, respectively, depending on user's manipulation; an output means for outputting digital signals corresponding to digital contents to a connectable output device; a memory for storing a program and data which are necessary for operation; an arrangement unit for arranging folders and files as a designated arrangement mode; and a CPU for recognizing the plurality of play modes corresponding to the key signals, determining play sequence of the digital contents recorded in the recording medium depending on the play mode selected by control of the arrangement unit, reading the digital contents recorded in the recording medium depending on the play sequence by controlling the data read means, and outputting the digital signals corresponding to the digital contents to the output means.

Preferably, the data read means comprises: an optic pick-up module for reading the digital contents recorded in a compact disk; an optic pick-up driver for driving the optic pick-up module to play the digital contents depending on the play sequence by control of the CPU; and a signal processing unit for modulating and digitalizing signals read in the optic pick-up module and then outputting the signals to the CPU.

Preferably, the arrangement unit comprises: a file arrangement unit for arranging files recorded in the recording medium; and a folder arrangement unit for arranging folders set in the recording medium. Here, the folder arrangement unit performs at least one or more of a "breadth first arrangement mode" and a "depth first arrangement mode", and the folder arrangement unit arranges folders in name sequence.

Preferably, the CPU performs one of the "breadth first arrangement mode" or the "depth first arrangement mode" preferentially for initialization at a system booting point.

In still another embodiment, there is provided a digital contents playback apparatus comprising: a key signal generating unit for outputting key signals corresponding to a "physical address first arrangement mode" depending on user's manipulation; a data read means for reading digital contents recorded in a recording medium; an output means for outputting digital signals corresponding to digital contents to a connectable output device; a memory for storing a program and data which are necessary for operation; an arrangement unit for performing arrangement corresponding to the "physical address first arrangement mode"; and a CPU for controlling arrangement unit corresponding to the "physical address first arrangement mode", reading the digital contents recorded in the recording medium on a basis of physical address sequence by controlling the data read means, and outputting the digital signals corresponding to the digital contents to the output means.

Preferably, the folder arrangement unit performs at least one or more of a "breadth first arrangement mode" and a "depth first arrangement mode", and the file arrangement unit further performs a "filename first arrangement mode".

In an embodiment, there is also provided a method for playing digital contents. The method comprises: the 1st step of reading information related to files and folders from a recording medium and performing initialization at a system booting point; the 2nd step of performing arrangement on the files and the folders depending on a pre-set play mode; and the 3rd step of performing re-arrangement on the files and/or the folders depending on one selected from at least two or more play modes by a user.

Preferably, the arrangement mode in the 2nd step is performed by selecting one of the "breadth first arrangement mode" or the "depth first arrangement mode".

In the 3rd step, the "physical address first arrangement mode" is included in play modes selectable by the user so that files are arranged in physical address sequence, and at least one or more of the "breadth first arrangement mode", the "depth first arrangement mode" or the "filename first arrangement mode" are included in play modes selectable by the user.

In another embodiment, there is provided a method for playing digital contents. The method comprises: the 1st step of reading information related to files and folders from a recording medium and performing initialization at a system booting point; the 2nd step of performing arrangement on the files and the folders depending on a pre-set play mode; and the 3rd step of performing rearrangement on the files depending on a "physical address first arrangement mode" by a user to determine play sequence.

In the 3rd step, the re-arrangement is performed on files depending on the "physical address first arrangement mode" by a selective arrangement method.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

In general, a digital contents playback apparatus includes portable devices using recording media such as a read/write compact disk, a semiconductor memory (flash memory, etc.) or a hard disk and all devices for storing and playing digital contents as electronic files, and the present invention may be carried out to the above-described digital contents playback apparatus.

In an embodiment of the present invention, a digital contents playback apparatus using a read/write compact disk as a recording medium is exemplified.

Figure 1:
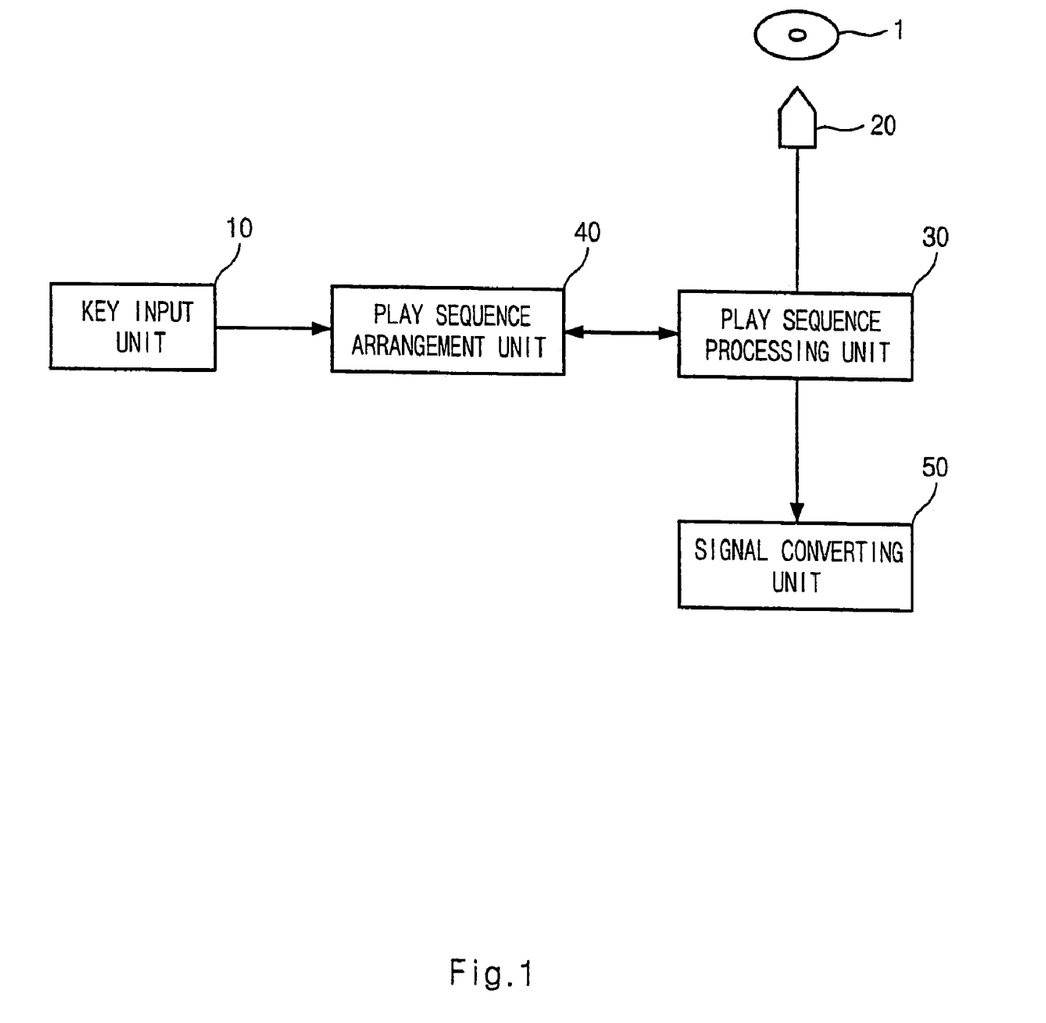
FIG. 1 is a block diagram generally illustrating a digital contents playback apparatus according to an embodiment of the present invention.

FIG. 1 is a block diagram generally illustrating a digital contents playback apparatus using a read/write compact disk. The digital contents playback apparatus comprises a key input unit 10, an optic pick-up module 20, a play signal processing unit 30, a play sequence arrangement unit 40 and a signal converting unit 50.

The digital contents playback apparatus reads information recorded in a compact disk 1 which is preferably a read/write compact disk.

The key input unit 10 comprises a plurality of keys (or buttons), and outputs signals corresponding to the keys if a user manipulates the keys. The user manipulates the key input unit 10 to select play modes for arranging files stored sequentially in the compact disk 1 or to listen to the stored music files, that is, digital contents.

Here, the play modes consist of a "breadth first arrangement mode" a "depth first arrangement mode" and a "disk all arrangement mode". In the "breadth first arrangement mode" and the "depth first arrangement mode", folders and files are arranged. However, only files are arranged in the "disk all arrangement mode" which consists of a "filename first mode" and a "physical address first mode".

Additionally, a "play" command is provided so that a user may listen to stored files, that is, digital contents.

The optic pick-up module 20 irradiates light while moving on the compact disk 1, and reads-data recorded in the compact disk 1 with the reflected light.

The play signal processing unit 30 processes and restores data read by the optic pick-up module 20.

The play sequence arrangement unit 40 selectively arranges folders (directory) and files in the compact disk 1 depending on a play mode selected by a user.

Specifically, if power is turned on, the optic pick-up module 20 reads data recorded in the compact disk 1, and the play signal processing unit 30 transfers TOC (Table of Contents) information read from the optic pick-up module 20 to the play sequence arrangement unit 40. Then, the play sequence arrangement unit 40 detects information related to folders and files in the compact disk 1 as the TOC information.

The detected information related to files and folders is used in play sequence arrangement. The detected information related to files includes physical address of files, filenames and mother folder numbers, and the information related to folders includes the number of files, mother folder numbers and folder names. Here, the mother folder refers to an upper folder including a specific file or a specific folder.

If power is turned on, the play sequence arrangement unit 40 arranges folders and files depending on the "breadth first arrangement mode" using the TOC information for initialization. Next, if a user manipulates the key input unit 10, the play sequence arrangement unit 40 performs the corresponding operation.

If a user selects a re-arrangement mode other than the "breadth first arrangement mode", the play sequence arrangement unit 40 re-arranges folders and files using the TOC information.

As described above, the "breadth first arrangement mode" reduces operation amounts in re-arrangement of folders and files and simplifies the process for mode change in re-arrangement of folders and files.

The signal converting unit 50 coverts digital signals outputted from the play signal processing unit 30 into analog signals.

Figure 2:
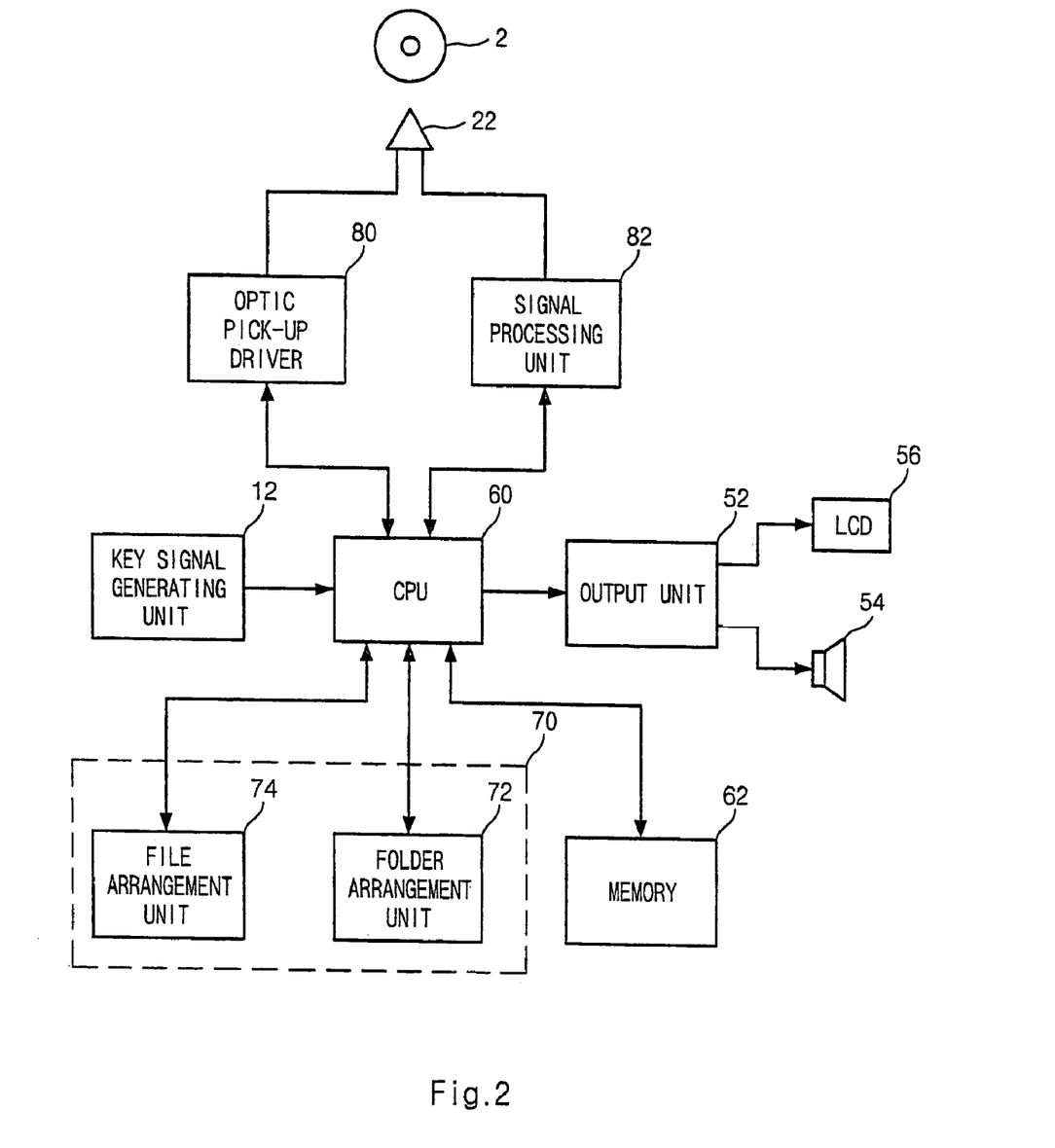
FIG. 2 is a detailed block diagram illustrating a digital contents playback apparatus according to an embodiment of the present invention.

FIG. 2 is a detailed block diagram illustrating a digital contents playback apparatus according to an embodiment of the present invention.

Referring to FIG. 2, the digital contents playback apparatus comprises a key signal generating unit 12, an optic pick-up module 22, a central processing unit (hereinafter, referred to as "CPU") 60, a memory 62, an output unit 52, a speaker 54, a liquid crystal display device (hereinafter, referred to as "LCD") 56, an arrangement unit 70, an optic pick-up driver 80 and a signal processing unit 82. Here, the arrangement unit 70 consists of a folder arrangement unit 72 and a file arrangement unit 74. The LCD is illustrated as an example of display devices, and may be replaced with an organic EL display device. The reference number 2 is a compact disk.

When the configuration of FIG. 2 is compared with that of FIG. 1, the key input unit 10 of FIG. 1 corresponds to the key signal generating unit 12 of FIG. 2, and the optic pick-up module 20 of FIG. 1 corresponds to the optic pick-up module 22 of FIG. 2. The signal converting unit 50 of FIG. 1 corresponds to the output unit 52 of FIG. 2, and the play signal processing unit 30 of FIG. 1 corresponds to partial functions of the optic pick-up driver 80, the signal processing unit 82 and the CPU 60 of FIG. 2. The play sequence arrangement unit 40 of FIG. 1 corresponds to partial functions of the arrangement unit 70 and the CPU 60 of FIG. 2. The playback of FIG. 2 further comprises the LCD 56 which is used for a user interface screen and the speaker 54 for audio output.

The key signal generating unit 12 generates key signals corresponding to key (button) selection of a user and outputs the key signals to the CPU 60.

The optic pick-up driver 80 having a DC motor moves the optic pick-up module 22 on the compact disk 2 depending on control of the CPU 60.

The signal processing unit 82 modulates and digitalizes signals recognized optically in the optic pick-up module 22, and input the signals to the CPU 60.

The output unit 52 converts digital signals outputted from the CPU 60 into analog signals, and outputs the signals for display to the LCD 56 and the audio signals to the speaker 54 or a speaker output port (not shown).

The memory 62 includes a ROM and a RAM, and stores a program and data X which are necessary for the operation of the CPU 60.

The arrangement unit 70 consists of the folder arrangement unit 72 for arranging folders and the file arrangement unit 74 for arranging files. A "breadth first arrangement mode" or a "depth first arrangement mode" is performed as a series of processes interworked with the folder arrangement unit 72 and the file arrangement unit 74 depending on control of the CPU 60. A "filename first arrangement mode" or a "physical address first arrangement mode" included in a "disk all arrangement mode" is performed as a series of processes by the file arrangement unit 74 depending on control of the CPU 60.

The "breadth first arrangement mode" first arranges folders and files included in the most significant layer, that is, a root folder, and then arranges files and folders from the upper level to the lower level.

Figure 3:
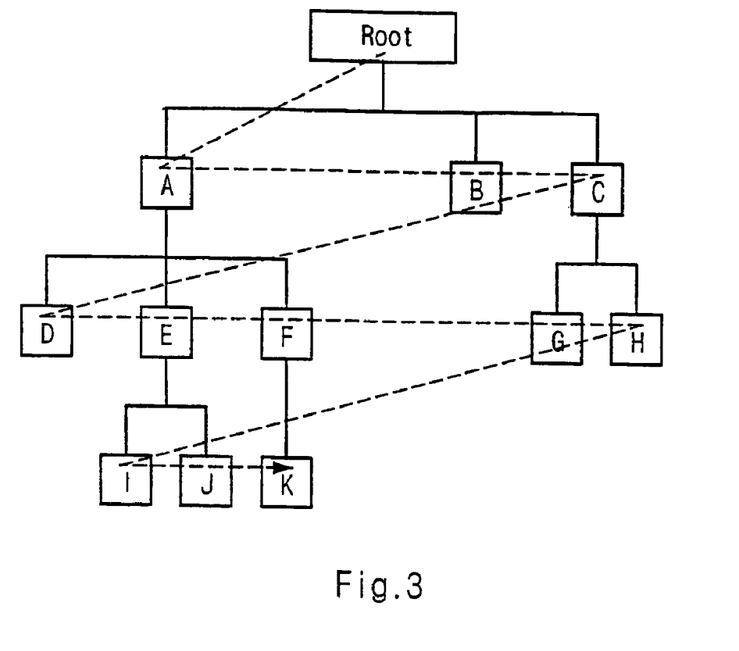
FIG. 3 is a diagram illustrating a method for arranging folders depending on a "breadth first arrangement mode".

FIG. 3 is a diagram illustrating a method for arranging folders depending on a "breadth first arrangement mode".

As shown in FIG. 3, files of the root folder which is the most significant folder are first arranged in the "breadth first arrangement mode". Thereafter, files included in folders A, B and C of the first layer are arranged in folder name sequence (A→B→C), files included in folders D, E, F, G and H of the second layer are arranged in folder name sequence (D→E→F→G→H), and files included in folders I, J and K of the lowest layer are arranged in folder name sequence (I→J→K).

Although there are various methods for designating priority of each folder in the same layer, folders are arranged in alphabetical order according to an embodiment of the present invention.

The play sequence arranged in the above-described way is stored in the memory 62.

The "depth first arrangement mode" arranges files from the lower layer to the upper layer. Files included in a folder are arranged when the folder is selected, and then an upper layer folder or a lower layer folder is selected for arrangement.

Figure 4:
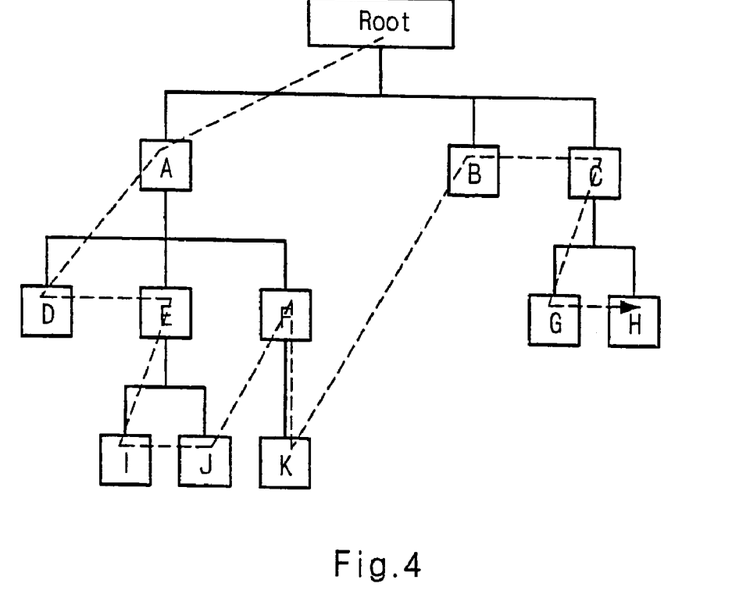
FIG. 4 is a diagram illustrating a method for arranging folders depending on a "depth first arrangement mode".

As shown in FIG. 4, files of the root folder which is the most significant layer folder are first arranged in the "depth first arrangement mode". For example, a folder A having the preceding folder name is selected from folders whose mother folder is a root folder, and files in the folder A are arranged. Thereafter, if there is a folder whose mother folder is the folder A, a folder D having the preceding folder name is selected from lower layer folders whose mother folder is the folder A, and files in the folder D are arranged, and there are no folders whose mother folder is the folder D. Therefore, the next folder E whose mother folder is the folder A is selected, and files included in the folder E are arranged. Then, if there are folders whose mother folder is the folder E, a folder I having the preceding folder name is selected from folders whose mother folder is the folder E, and files included in the folder I are arranged.

In the above-described way, lower level folders of the folder A are arranged in sequence like D, E, F, I, J and K. Thereafter, folders B and C whose levels are the same as that of the folder A and other lower folders which belong to the folders B and C are arranged in the above-described way.

The play sequence arranged in the above-described way is stored in the memory 62.

In the "filename first arrangement mode" or the "physical address first arrangement mode" which are included in the "disk all arrangement mode", the whole files are arranged in sign, numerical, and alphabetical sequence regardless of the hierarchical structure of folders or each file is arranged in physical address sequence recorded in the actual disk 1. The "disk all arrangement mode" is performed by the file arrangement unit 74, and arrangement results are recorded in the memory 62.

The "filename first arrangement mode" is provided for the convenience of users, and the "physical address first arrangement mode" is beneficial in reduction of noise or power consumption.

In the "breadth first arrangement mode" or the "depth first arrangement mode", files are arranged depending on the hierarchical structure of folders including the corresponding files regardless of physical addresses recorded in the disk 1. When the corresponding files are played, the optic pick-up module 22 moves frequently to search the corresponding files, which results in large power consumption and lots of noise. However, in the "physical address first arrangement mode", since files are arranged in physical address sequence, the driving of the optic pick-up module 22 is minimized, which results in reduction of power consumption and noise.

The CPU 60 of FIG. 2 performs control operation in response to key signals outputted from the key signal generating unit 12 depending on the above-described modes or on user's manipulation of keys.

Figure 5:
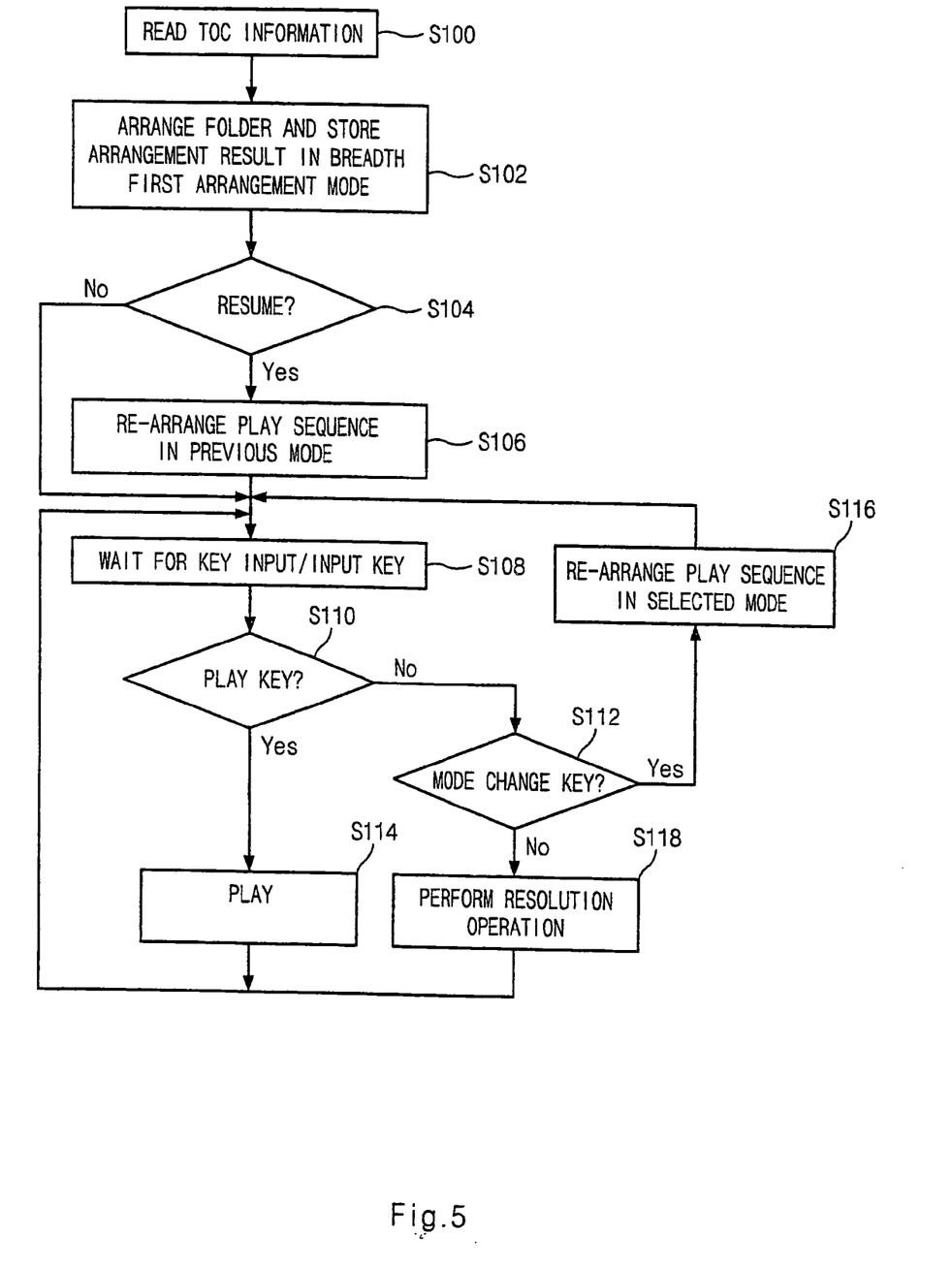
FIG. 5 is a flow chart illustrating operation sequence of a digital contents playback apparatus according to an embodiment of the present invention.

FIG. 5 is a flow chart illustrating operation sequence of a digital contents playback according to an embodiment of the present invention.

If a user inserts the compact disk 2 into a deck of a playback, the CPU 60 reads the TOC information (S100). Here, the CPU 60 controls the optic pick-up driver 80 to drive the optic pick-up module 22. Then, the TOC information stored in the compact disk 2 is read by the optic pick-up module 22, transmitted to the CPU 60 through the signal processing unit 82, and temporarily stored in the memory 62.

Thereafter, the CPU 60 controls the arrangement unit 70, and first arranges folders in the "breadth first arrangement mode" using information related to folders and files which is extracted from the TOC information (S102). Here, the folder number is set.

After the CPU 60 performs arrangement in the "breadth first arrangement mode", the CPU 60 judges whether it performs "resume" (S104). The "resume" is an operation for changing an arrangement state to the previous arrangement mode that a user has used before, and provided for the convenience of users. Furthermore, data for the "resume" operation are set in the memory 62 or in a register of the CPU 60.

The CPU 60 checks the "resume" operation, and re-arranges play sequence in the previous mode if necessary (S106). If the "resume" operation is not required, the CPU 60 waits for key signal input (S108).

If key signals are inputted while the CPU waits for key signal input, the process for confirming whether the key signal corresponds to a "play" key (S110) and the process for confirming whether the key signal corresponds to a mode change key (S112) are sequentially performed.

If the key signal corresponds to the "play" key, the CPU 60 performs a play operation (S114). That is, the CPU 60 controls the optic pick-up driver 80 to drive the optic pick-up module 22. If data are inputted in the signal processing unit 82, the CPU 60 outputs corresponding signals to the LCD 56 or the speaker 54 through the output unit 52.

If the key signal corresponds to the mode change key, the CPU 60 re arranges play sequence in a selected mode (S116). However, if the key signal does not correspond to the mode change key, the CPU 60 performs an operation corresponding to the key signal (S118).

Figure 6:
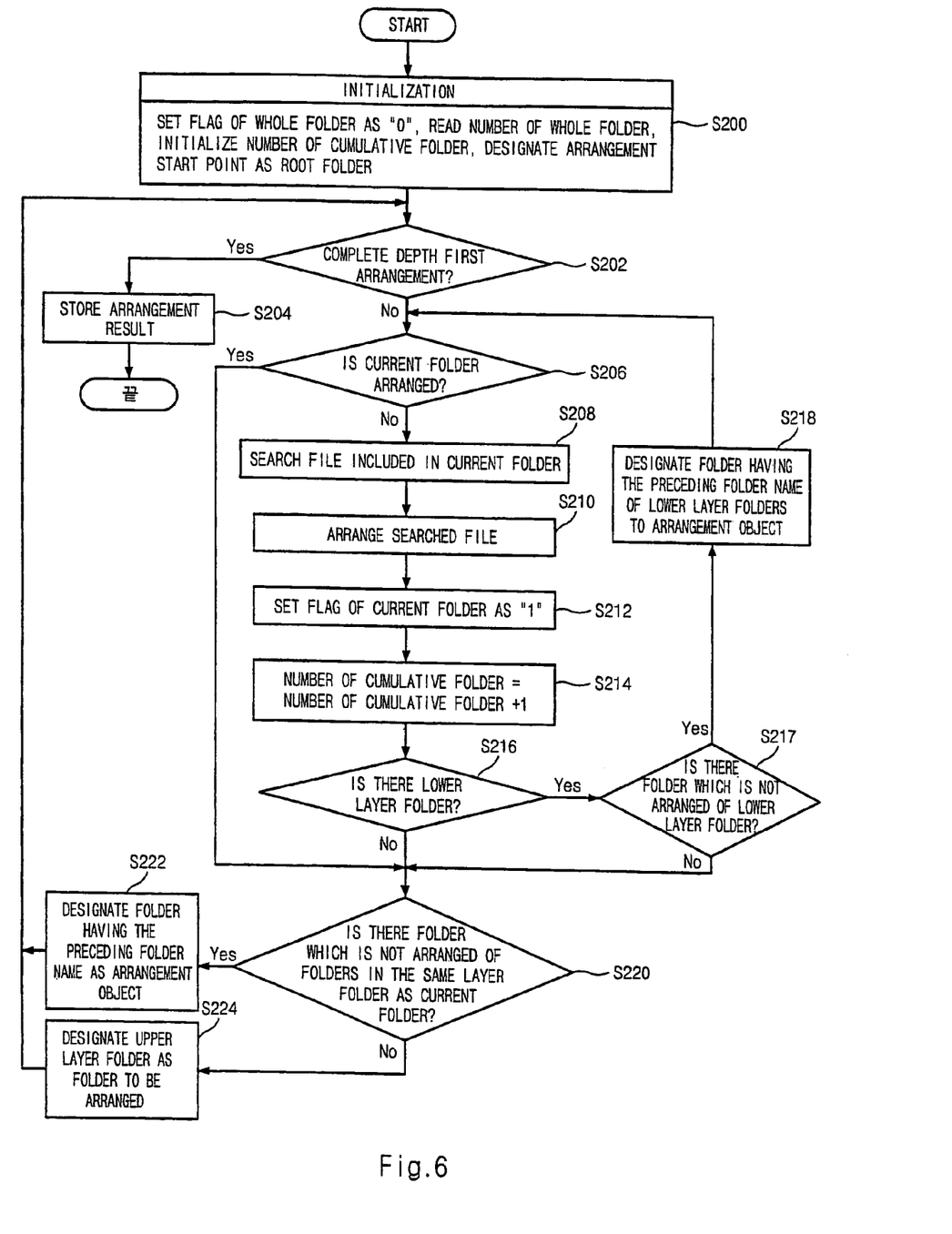
FIG. 6 is a flow chart illustrating a method for changing arrangement sequence to a "depth first arrangement mode" and sequentially arranging files in each folder.
Figure 7:
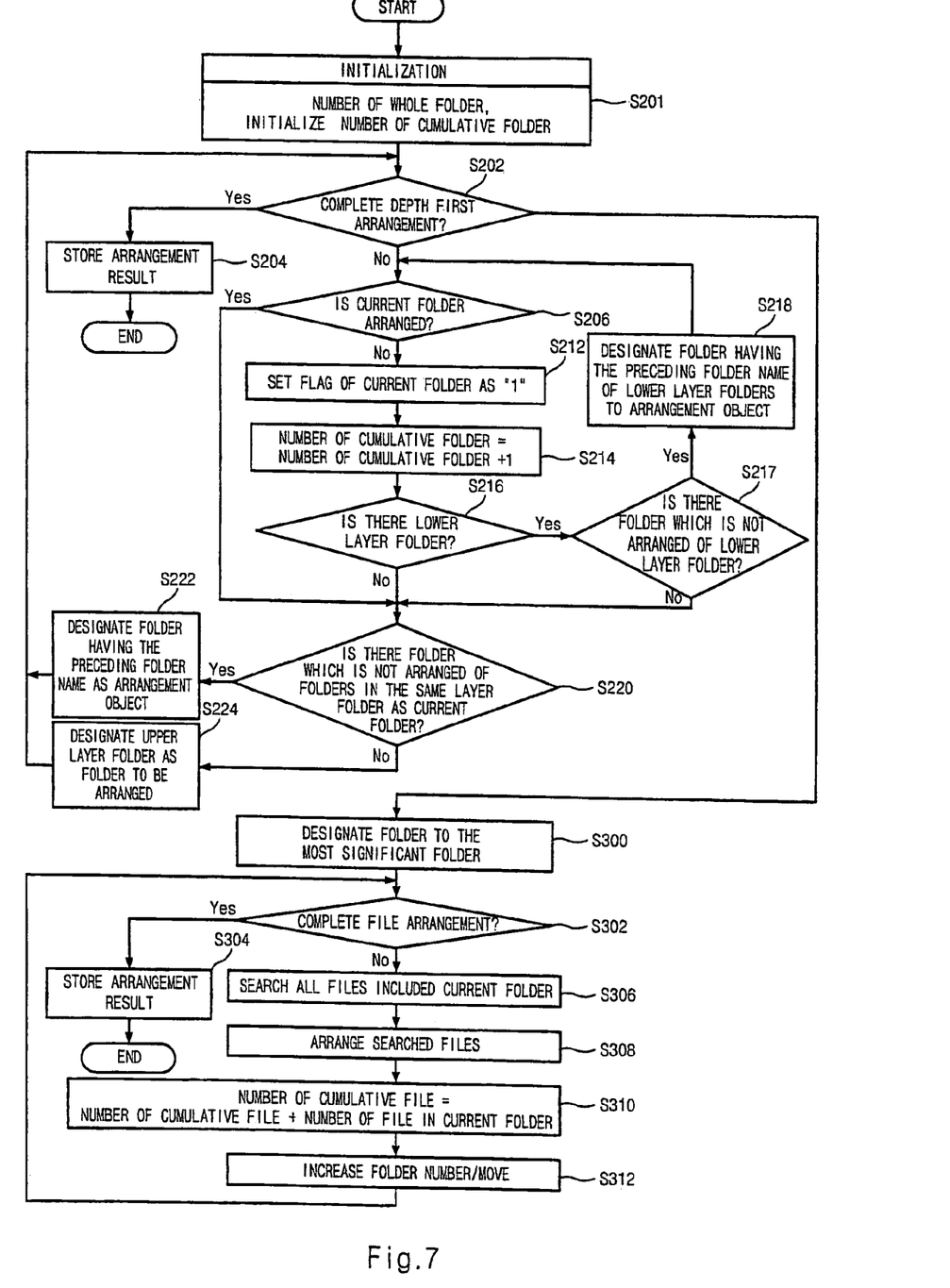
FIG. 7 is a flow chart illustrating a method for changing arrangement sequence to a "depth first arrangement mode" and arranging the whole folders and then files.

In an embodiment, the digital contents playback apparatus is operated according to the above-described method in FIG. 5. The re-arrangement of the "depth first arrangement mode" may be performed in the step S104 or the step S116, and in this case, files are re-arranged as shown in FIGS. 6 and 7. FIG. 6 is a flow chart illustrating a method for arranging files in each folder, and FIG. 7 is a flow chart illustrating a method for arranging the whole folders and then files in arranged folder sequence.

Referring to FIG. 6, initialization is first performed in case of "resume" or mode change (S200). In the initialization process, flags of whole folders are set as "0", the number of the whole folders is counted, the number of cumulative folders is initialized, and an arrangement start point is designated to a root folder which is the most significant level. Here, flags of each folder are set to judge arrangement completion. When the arrangement is not completed, a flag is set as "0", and otherwise set as "1".

After the initialization process, completion of the "depth first arrangement mode" is checked (S202). If the number of cumulative folders is identical with that of whole folders, the arrangement is completed and then the arrangement result is stored (S204).

If the "depth first arrangement mode" is not completed, the arrangement state of a currently designated folder is checked (S206), that is, the flag setting state of the corresponding folder is checked. The folders are arranged if the flag is set as "1" while the folders are not arranged if the flag is set as "0".

If the corresponding folders are not arranged, files included in the folders to be arranged are searched (S208), and the searched files are arranged (S210). Here, the arrangement of files is performed in the file arrangement unit 74, and files may be arranged in name sequence.

When the search and arrangement on files in the current folder are completed, the flag of the current folder is sets as "1" (S212), and the number of cumulative folders is increased by 1 (S214).

Thereafter, whether the current folder includes a lower layer folder is checked (S216). If the current folder includes a lower layer folder, whether there is one of the unarranged lower layer folders is checked (S217). Here, the step S216 may be confirmed by checking whether there is a folder whose mother folder is designated to the current folder, and the step S217 may be confirmed by checking the flag setting state of folders designated to the lower folder.

If there are no lower layer folders in the step S216 or if the lower layer folders are all arranged in the step S217, the step S220 is performed. If the current folder is arranged in the step S206, the step S220 is also performed.

Meanwhile, if there is a folder of unarranged lower folders in the step S217, a folder having the preceding folder name is designated to a folder to be arranged next (S218), and then the step S206 is performed.

The step S220 is performed when the arrangement of current folder and its lower layer folders is completed. Therefore, whether there is an unarranged folder included in the same layer folders as the current folder is checked. The folder included in the same layer folder as the current folder has the same mother folder. That is, in the step S220 is checked whether there is an unarranged folder of other folders located in the same mother folder and the same layer. If there is an unarranged folder, a folder having the preceding folder name is designated to the next arranged folder (S222). Otherwise, an upper layer folder is designated to a folder to be arranged (S224). When the upper layer folder is designated to the folder to be arranged, a folder having the preceding folder name may be designated regardless of the arrangement state, and a folder having the preceding folder name from unarranged folders may be designated with reference to the arrangement state. The above designation method may be susceptible to various modifications depending on manufacturer's purpose. After the steps S222 and S224, the step S202 is performed.

The above-described "depth first arrangement mode" of FIG. 6 with a tree structure as shown in FIG. 4 is described in more detail.

If the initialization (S200) is performed, flags of all folders are set as "0", the number of whole folders is read as "12", the number of cumulative folders is initialized as "0", and the arrangement start point is designated to a root folder.

Since the "depth first arrangement mode" is not completed (S202) and the flag of the rood folder is set as "0" (S206), files included in the root folder are searched and arranged (S208, S210). Thereafter, the flag of the root folder is set as "1" (S212), and the number of cumulative folders increases from "0" to "1" (S214).

The root folder has lower layer folders (S216), and there are unarranged folders from the lower layer folders. As a result, the folder A having the preceding folder name is designated to a folder to be arranged next (S218), and whether the folder A is arranged is checked (S206).

Since the folder A has a current flag set as "0", files of the folder A are searched and arranged (S208, S210) and the flag of the folder A is set as "1" (S212), and the number of cumulative folders increases from "1" to "2" (S214).

The folder A has lower layer folders (S216), and there are unarranged folders from the lower layer folders (S217). As a result, the folder D having the preceding folder name is designated to a folder to be arranged next (S218), and whether the folder D is arranged is checked (S206).

Since the folder D has a current flag set as "0", files of the folder D are searched and arranged (S208, S210) and the flag of the folder D is set as "1" (S212), and the number of cumulative folders increases from "2" to "3" (S214).

Since the folder D has no lower layer folders (S216), whether there is an unarranged folder from the same layer folders is checked (S220), and the folder E is designated to the next arranged folder (S222). Then, since the current number of cumulative folders is "3" and the "depth first arrangement mode" is not completed (S202), whether the folder E is arranged is checked (S206).

Since the folder E has a current flag set as "0", files of the folder E are searched and arranged (S208, S210) and the flag of the folder E is set as "1" (S212), and the number of cumulative folders increases from "3" to "4" (S214).

The folder E has lower layer folders (S216), and there are unarranged folders from the lower layer folders (S217). As a result, the folder I having the preceding folder name is designated to a folder to be arranged next (S218).

In the above-described way, the folder J following the folder I is designated to the arranged folder, the folder F following the folder J is designated to the arranged folder, and then the folder K following the folder F is designated to the arranged folder.

After files included in the folder K are arranged, the number of cumulative folders becomes "8".

After the arrangement of the folder K is completed, the folder K has no lower layer folder (S216), and there is no folder of the same layer to be arranged (S220). As a result, the upper layer folder F is designated to the arranged folder (S224). However, since the number of cumulative folders is "8", the "depth first arrangement mode" is not completed, and the folder F is arranged (S206).

Therefore, the upper layer folder A is designated to the arranged folder. However, since the number of cumulative folders is "8", the "depth first arrangement mode" is not completed, the folder A is arranged (S206), and there are unarranged folders of the same layer folders (S220). As a result, the folder B having the preceding folder name of the same layer folders is designated to the next arranged folder. By the above-described method, the folder C is arranged after the folder B, the folder G is arranged after the folder C, and the folder H is arranged after the folder G.

If the arrangement of the folder H is completed, the number of cumulative folders becomes "12". As a result, the "depth first arrangement mode" is completed (S202), and the arrangement result is stored (S204).

FIG. 6 shows an example for arranging files when a folder is selected in the arrangement of folders, and FIG. 7 shows an example for arranging first folders and the files depending on the arranged folder sequence.

Specifically, in FIG. 7, the initialization (S201) corresponding to that of FIG. 6 is performed. The initialization (S201) further comprises a count process on the number of whole files and an initialization process on the number of cumulative files.

The embodiment of FIG. 7 does not include the step (S208) for searching files included in the arranged folder and the step (S210) for arranging the searched files in the steps S201 and S224 of FIG. 6.

In FIG. 7, the "depth first arrangement mode" is completed only on folders without arrangement of files. Thereafter, if the "depth first arrangement mode" is completed on folders, the steps S300 to S312 are performed to arrange files in each folder in the arranged folder sequence.

In the embodiment of FIG. 7, the folder arrangement unit 72 determines folder sequence such as root-A-D-E-I . . . -G-H under control of the CPU 60, and the file arrangement unit 74 arranges files in filename sequence depending on the determined folder sequence. The arrangement results are stored in the memory 62.

More specifically, the folder sequence of FIG. 7 is determined in sequence such as root-A-D-E-I . . . -G-H according to the method of FIG. 6. In this process, if the number of cumulative folders is counted as "12", the "depth first arrangement mode" is completed (S202), and the arrangement location is designated to the most significant folder (S300).

Thereafter, the completion of file arrangement is checked (S302). If the file arrangement is completed, the arrangement result is stored in the memory 62 (S304). Here, the completion of the file arrangement is determined by checking whether the number of cumulative files is identical with that of whole files.

If the file arrangement is not completed (S302), files included in the current folder are all searched (S306), and the searched files are arranged (S308). The file arrangement 74 arranges files.

Then, the number of files in the current folder is added to that of cumulative files, the number of all arranged cumulative files is counted (S310), and moves to the next arranged folder by increasing the folder number (S312).

The file search and arrangement in each folder proceed on until the file arrangement is completed.

FIGS. 6 and 7 shows examples for arranging folders and files in the "depth first arrangement mode". Although the re-arrangement corresponding to the steps S106 and S116 of FIG. 5 is performed by the methods in FIGS. 6 and 7, the folder number set in the "breadth first arrangement mode" determined in the step S102 of FIG. 5 is not changed. That is, the sequence of the folder number is only changed without change of the folder number.

Figure 8:
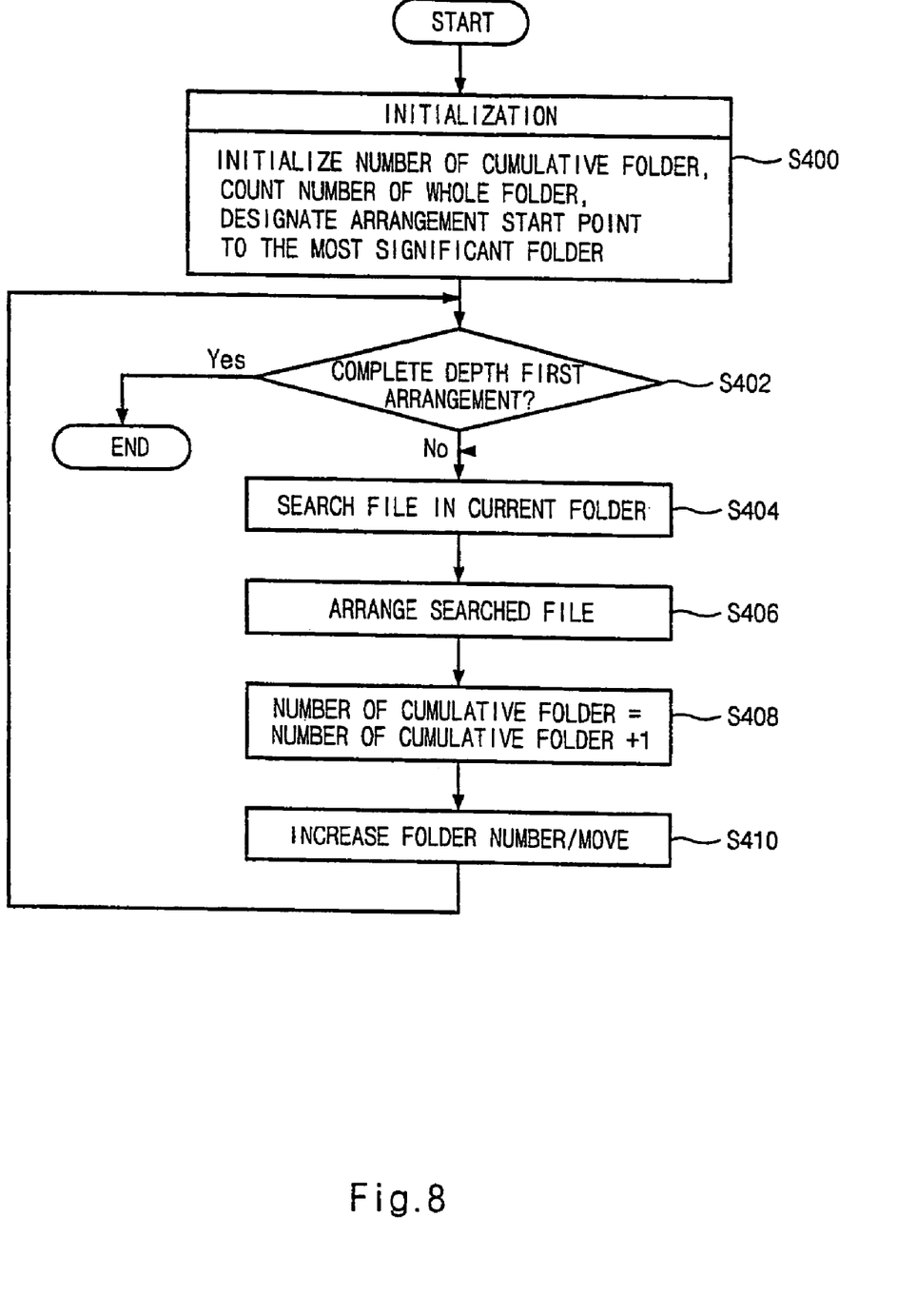
FIG. 8 is a flow chart illustrating a method for changing arrangement sequence to a "breadth first arrangement mode".

The arrangement state set as another mode in the step S116 of FIG. 5 can be changed into the "breadth first arrangement mode". In this case, the process may be performed as shown in FIG. 8 using the initial folder number set in FIG. 6, and the folder movement can be performed by increase of the folder number. Therefore, the flag setting for judging the arrangement state of folders is not required in the process of re-arrangement to the "breadth first arrangement mode".

Specifically, the initialization for re-arrangement to the "breadth first arrangement mode" is performed (S400). In this step, the number of cumulative folders is initialized, the number of whole folders is counted, and the arrangement start folder is designated as a root folder.

Thereafter, whether the "breadth first arrangement mode" is completed is checked (S402). If the number of cumulative folders is identical with that of whole folders, the re-arrangement is finished.

However, if the "breadth first arrangement mode" is not completed, files included in the corresponding folder are all searched (S404), and the searched files are arranged in the file arrangement unit 74 (S406). The number of cumulative folders increases to "1" (S408), and the arranged folder location is moved by increasing the folder number (S408). Here, the file arrangement unit 74 arranges files in filename sequence.

The above-described steps S402 to S410 are repeated, thereby completing the "breadth first arrangement mode".

In other words, when the play sequence is determined such as root-A-D-E-I- . . . -G-H depending on the "depth first arrangement mode", the re-arrangement of FIG. 8 is performed according to the mode change, and the play sequence is set as root-A-B-C-D- . . . -J-K.

In the above re-arrangement process of FIG. 8, the "breadth first arrangement mode" uses the folder number set in the initialization process of FIG. 6, which does not require configuration of algorithm for setting flags.

In an embodiment of the present invention, the "disk all arrangement mode" may be selected by a user. In this case, the file arrangement unit 74 re-arranges not folders but files on a basis of filenames or physical address.

Figure 9:
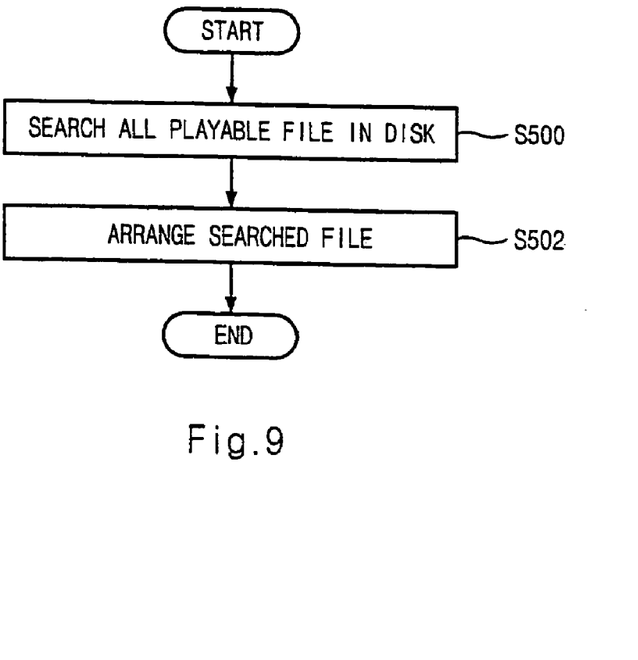
FIG. 9 is a flow chart illustrating a method for changing arrangement sequence to a "disk all arrangement mode".

In this case, as shown in FIG. 9, all playable files in a disk are searched (S500), and the searched files are arranged in the file arrangement unit 74.

Figure 10:
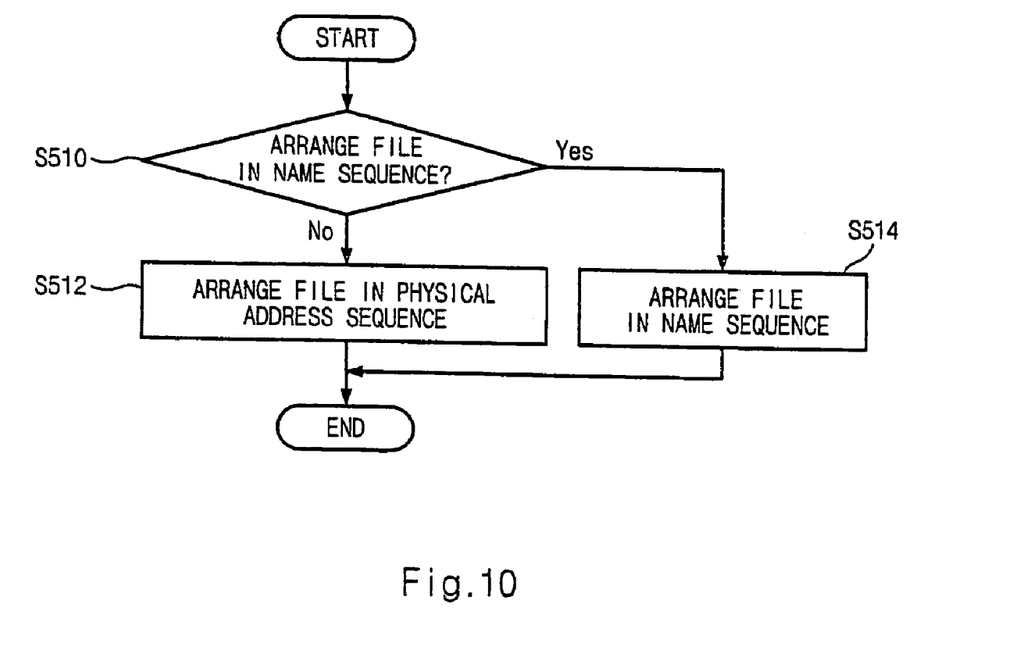
FIG. 10 is a detailed flow chart illustrating file arrangement in a file arrangement unit in a step of FIG. 9.

The file arrangement method may be determined by user's selection. Furthermore, functions of arranging files depending on physical addresses and of arranging files depending on filenames may be provided as shown in FIG. 10. That is, as shown in FIG. 10, the file arrangement unit 74 determines whether files are arranged in filename sequence in response to key signals inputted by user's selection (S510). If the files are not arranged in filename sequence, files are arranged in physical address sequence (S512). Otherwise, the files are arranged in filename sequence (S514).

Here, when files are arranged in physical address sequence, memory usage may be minimized by applying a general selective arrangement method.

A selective arrangement method using a buffer register is as follows.

Here, stored data are arranged in adjacent registers A, B and C, and a physical address value stored in the register A is larger than those in the registers B and C. The physical address value stored in the register B is smaller than that in the register C. The data are arranged from smaller physical address value to larger one.

First, values of the registers A and B are compared. Since the value of the register B is small, the value of the register B moves to the buffer register, the value of the register A moves to the register B, and the value of the buffer register moves to the register A. As a result, data are move between the registers A and B. Then, values of the registers B and C are compared. Since the value of the register C is smaller than that of the register B, the value of the register C moves to the buffer register, the value of the register B moves to the register C, and the value of the buffer register moves to the register B. As a result, the registers A, B and C are re-arranged in smaller address value sequence.

In the above-described embodiment, files in each folder are arranged depending on the "breadth first arrangement mode" or the "depth first arrangement mode". However, files in each folder may be arranged in physical address sequence or the amount of files.

The "physical address first arrangement mode" may be applied to the following methods: (1) a method for arranging whole files in a disk in a physical address sequence regardless of folders; (2) a method for arranging folders depending on the "breadth first arrangement mode" or the "depth first arrangement mode" and then arranging files in each folder in physical address sequence; and (3) a method for arranging both of folders and files in each folder in physical address sequence.

The kinds of play sequence are displayed to a user through a menu screen provided in the digital contents playback apparatus, and the user can select a play method of folders and files using the key input unit 10.

As described above, the digital contents playback apparatus according to an embodiment of the present invention provides the convenience of users by playing files stored in a disk consisting of multi-layered folders in user's desired sequence.

Furthermore, when a user intends to use a digital contents playback apparatus without noise in public places such as library, the user arranges files and/or folders in physical address sequence according to the present invention to select a play mode. Then, files and/or folders are arranged in physical address sequence, and the movement of an optic pick-up module is minimized, thereby reducing power consumption and noise. As a result, the user can use the digital contents playback apparatus without any inconvenience in public places which require silence.

In addition, a digital contents playback apparatus according to an embodiment of the present invention includes portable devices using recording media such as a read/write compact disk, a semiconductor memory (flash memory, etc.) or a hard disk and other devices for storing and playing digital contents as electronic files. Also, these devices can provide the convenience of users and reduce power consumption and noise.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An apparatus for digital contents playback, comprising:
   a key input unit for outputting key signals corresponding to a plurality of play modes according to user manipulation;
   a play sequence arrangement unit for determining a play sequence of digital contents stored in a recording medium, the play sequence based on a play mode selected via the key input unit, and providing arrangement modes comprising a "breadth first arrangement mode", a "depth first arrangement mode" and a "disk all arrangement mode";
   a data read means for reading the digital contents stored in the recording medium and outputting the digital contents as electrical signals depending on the play sequence determined in the play sequence arrangement unit; and
   a play signal processing unit for controlling the data read means depending on the play sequence and converting electrical signals from the data read means to digital signals; and
   a signal converting unit for outputting digital signals from the data read means to a connectable output device, wherein the "disk all arrangement mode" further comprises a "physical address first arrangement mode" corresponding to an order in which the digital contents were stored in the recording medium.

2. The apparatus of claim 1, wherein the play sequence arrangement unit further provides a "filename first arrangement mode" corresponding to the "disk all arrangement mode".

3. The apparatus of claim 1, wherein the play sequence arrangement unit arranges at least one of files and folders in name sequence in the "breadth first arrangement mode" and the "depth first arrangement mode".

4. The apparatus of claim 1, wherein the play sequence arrangement unit determines play sequence based on either "breadth first arrangement mode" or "depth first arrangement mode" upon initialization when the apparatus is turned on.

5. The apparatus of claim 1, wherein the data read means comprises an optic pick-up module.

6. An apparatus for playing digital contents stored in a compact disk, the apparatus comprising:
   a key input unit for outputting key signals corresponding to a play mode selected from play modes comprising a "physical address first arrangement mode," a "breadth first arrangement mode", a "depth first arrangement mode", and a "disk all arrangement mode" according to user manipulation;
   a play sequence arrangement unit for determining a play sequence of digital contents stored in a recording medium, the play sequence based on the selected play mode;
   an optic pick-up module for reading the digital contents stored in the recording medium according to the play sequence determined in the play sequence arrangement unit and outputting the digital contents as electrical signals;

a play signal processing unit for controlling the optic pick-up module according to the play sequence and converting electrical signals from the optic pick-up module to digital signals; and a signal converting unit for converting signals output from the play signal processing unit to analog signals and outputting the analog signals to a connectable output device, wherein the play sequence arrangement unit further determines the play sequence of digital contents stored in the compact disk according to a physical address associated with the digital contents at the time when the digital contents were stored on the recording medium when the "physical address first arrangement mode" is selected.

7. The apparatus of claim 6, wherein the play sequence arrangement unit arranges at least one of files and folders when the selected play mode is the "breadth first arrangement mode", the "depth first arrangement mode" or the "disk all arrangement mode".

8. The apparatus of claim 6, wherein the play sequence arrangement unit determines play sequence based on either "breadth first arrangement mode" or "depth first arrangement mode" when the apparatus is initialized.

9. An apparatus for digital contents playback, comprising:
a key signal generating unit for outputting key signals corresponding to a plurality of play modes according to user manipulation, wherein the plurality of play modes comprise a "breadth first arrangement mode", a "depth first arrangement mode" and a "disk all arrangement mode";
an output means for outputting digital signals corresponding to the digital contents to a connectable output device;
a memory for storing a program and data for operation of the apparatus;
an arrangement unit for arranging at least folders or files according to a designated arrangement mode, wherein the arrangement unit comprises a file arrangement unit for arranging files in the recording medium and a folder arrangement unit for arranging folders in the recording medium;
a data read means for reading digital contents from a recording medium; and
a CPU for recognizing the plurality of play modes corresponding to the key signals, determining a play sequence of the digital contents stored in the recording medium based on the recognized plurality of play modes, reading the digital contents from the recording medium according to the play sequence by controlling the data read means, and outputting digital signals corresponding to the digital contents to the output means, wherein the file arrangement unit arranges files according to a "physical address first arrangement mode" corresponding to an order in which the digital contents were stored in the recording medium.

10. The apparatus of claim 9, wherein the data read means comprises:
an optic pick-up module for reading the digital contents recorded in a compact disk;
an optic pick-up driver for driving the optic pick-up module to play the digital contents depending on the play sequence determined by the CPU; and
a signal processing unit for modulating and digitizing signals read in the optic pick-up module and outputting the digitized signals to the CPU.

11. The apparatus of claim 9, wherein the folder arrangement unit arranges folders according to at least the "breadth first arrangement mode" or the "depth first arrangement mode".

12. The apparatus of claim 9, wherein the folder arrangement unit arranges folders according to name sequence.

13. The apparatus of claim 9, wherein the file arrangement unit further arranges files according to a "filename first arrangement mode".

14. The apparatus of claim 9, wherein the CPU determines play sequence based on either "breadth first arrangement mode" or "depth first arrangement mode" when the apparatus is initialized at a system booting point.

15. An apparatus for digital contents playback, comprising:
a key signal generating unit for outputting key signals corresponding to a play mode selected from play modes comprising a "physical address first arrangement mode", a "breadth first arrangement mode", a "depth first arrangement mode" and a "disk all arrangement mode";
a data read means for reading digital contents from a recording medium;
an output means for outputting digital signals corresponding to the digital contents to a connectable output device
a memory for storing a program and data for operation of the apparatus;
an arrangement unit for arranging at least folders or files according to the "physical address first arrangement mode" corresponding to an order in which the digital contents were stored in the recording medium; and
a CPU for controlling the arrangement unit according to the "physical address first arrangement mode", reading the digital contents from the recording medium according to physical address sequence by controlling the data read means, and outputting the digital signals corresponding to the digital contents to the output means.

16. The apparatus of claim 15, wherein the data read means comprises:
an optic pick-up module for reading the digital contents recorded in a compact disk;
an optic pick-up driver for driving the optic pick-up module to play the digital contents depending on the selected play mode; and
a signal processing unit for modulating and digitizing signals read in the optic pick-up module and outputting the digitized signals to the CPU.

17. The apparatus of claim 15, wherein the arrangement unit comprises:
a file arrangement unit for arranging files in the recording medium in physical address sequence; and
a folder arrangement unit for arranging folders in the recording medium.

18. The apparatus of claim 17, wherein the folder arrangement unit arranges folders according to at least the "breadth first arrangement mode" or the "depth first arrangement mode".

19. The apparatus of claim 17, wherein the folder arrangement unit arranges folders according to name sequence.

20. The apparatus of claim 17, wherein the file arrangement unit arranges files according to a "filename first arrangement mode".

21. The apparatus of claim 15, wherein the CPU determines play sequence based on either "breadth first arrangement mode" or "depth first arrangement mode" when the apparatus is initialized.

22. A method for digital contents playback, comprising:
reading information related to files and folders from a recording medium and performing initialization;
arranging the files and the folders depending on a pre-set play mode, wherein the pre-set play mode is selected from at least a "breadth first arrangement mode", a "depth first arrangement mode" and a "disk all arrangement mode", wherein the "disk all arrangement mode" further comprises a "physical address first arrangement mode" corresponding to an order in which the digital contents were stored in the recording medium; and
re-arranging the files or the folders according to a selected play model, wherein re-arranging the files or the folders comprises:
selecting the "depth first arrangement mode",
performing initialization by setting flags of entire folders in response to selection of the play mode, initializing a number of flags of entire folders and current cumulative folders to count a number of entire folders and designate a start location as a root folder, and
determining the number of entire folders identical to a number of current cumulative folders counted in the initialization.

23. The method of claim 22, wherein the information related to files comprises at least physical address of files, filenames or mother file numbers, and the information related to folders comprises at least the number of folder, folder names or mother folder numbers.

24. The method of claim 23, wherein the mother folder numbers are set as a result of arranging the files and the folders.

25. The method of claim 24, wherein the re-arranging is performed by changing the sequence of the previously determined folder number without changing the folder number.

26. The method of claim 22, wherein re-arranging the files or the folders further comprises:
storing arrangement results if the number of entire folders and the number of current cumulative folders are identical, or confirming flag setting states of current cumulative folders if the number of entire folders and the number of current cumulative folders are not identical in order to confirm whether the current cumulative folders are arranged;
checking and arranging files included in the current cumulative folders if the current cumulative folders are not arranged;
setting flags of the current cumulative folders to an arrangement completion state after the checking and arranging step, increasing the number of current cumulative folders and confirming whether there is an unarranged lower layer folder;
designating a folder having a first folder name as an arrangement object if there is an unarranged lower layer folder, and confirming a flag setting state of current cumulative folders to confirm whether the current cumulative folders are arranged;
determining whether there is an unarranged folder among folders included in the same layer as the current cumulative folder if the current cumulative folder is arranged or if there is no unarranged lower folder; and
performing the determining and storing by designating a folder having the first folder name as an arrangement object if it is determined that there is an unarranged folder in the same layer as the current cumulative folder or by designating an upper layer folder as an arrangement object if there is no unarranged folder in the same layer as the current cumulative folder.

27. The method of claim 26, wherein re-arranging at least the files or the folders further comprises
designating a location of a most significant folder if the number of entire folders is identical to the number of current cumulative folders;
checking and arranging files included in each folder from the most significant folder in predetermined folder number sequence to accumulate the number of current cumulative files; and
storing arrangement results if the number of entire files is identical to the number of cumulative files.

* * * * *